(12) United States Patent
Williams et al.

(10) Patent No.: US 11,254,362 B2
(45) Date of Patent: Feb. 22, 2022

(54) VEHICLE ROCKER WITH LOAD TRANSFERRING SPACER

(71) Applicant: TOYOTA MOTOR ENGINEERING & MANUFACTURING NORTH AMERICA, INC., Plano, TX (US)

(72) Inventors: Paxton S. Williams, Milan, MI (US); James Chung, Ann Arbor, MI (US); Tyler Schnug, Northville, MI (US); Rahul Gururaj, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 118 days.

(21) Appl. No.: 16/777,391

(22) Filed: Jan. 30, 2020

(65) Prior Publication Data

US 2021/0237803 A1 Aug. 5, 2021

(51) Int. Cl.
| | | |
|---|---|---|
| *B62D 25/02* | (2006.01) | |
| *B62D 21/03* | (2006.01) | |
| *B62D 21/15* | (2006.01) | |
| *B62D 25/20* | (2006.01) | |

(52) U.S. Cl.
CPC .......... *B62D 25/025* (2013.01); *B62D 21/03* (2013.01); *B62D 21/157* (2013.01); *B62D 25/2036* (2013.01)

(58) Field of Classification Search
CPC ............... B62D 25/025; B62D 21/157; B62D 25/2036; B62D 21/03
USPC ............................ 296/193.05, 187.12, 30
See application file for complete search history.

(56) References Cited

U.S. PATENT DOCUMENTS

| 6,644,723 | B2 * | 11/2003 | Motozawa ............... B60N 2/06 |
| | | | 296/187.12 |
| 9,150,084 | B2 | 10/2015 | Makowski et al. |
| 9,688,311 | B2 | 6/2017 | Yamamoto et al. |
| 9,738,319 | B2 | 8/2017 | Hasegawa et al. |
| 9,776,665 | B2 * | 10/2017 | Garay Serrano .... B62D 21/157 |
| 10,363,968 | B2 | 7/2019 | Nusier et al. |
| 2014/0265443 | A1 * | 9/2014 | Meaige ............... B62D 29/005 |
| | | | 296/187.02 |
| 2015/0035316 | A1 | 2/2015 | Kuriyama et al. |
| 2015/0246651 | A1 | 9/2015 | Muraji et al. |
| 2017/0326954 | A1 | 11/2017 | Peidro |

(Continued)

FOREIGN PATENT DOCUMENTS

| CN | 201235856 Y | | 5/2009 | |
| GB | 2280647 A | * | 2/1995 | ........... B62D 21/157 |
| JP | 2015168355 A | | 9/2015 | |

OTHER PUBLICATIONS

Robert Reichert, Steve Kan, Development of a 2015 mid-size sedan vehicle model (https://www.dynalook.com/conferences/11th-european-is-dyna-conference/crash-model-building/development-of-a-2015-mid-size-sedan-vehicle-model), 11th European LS-Dyna Conference 2017, 10 pages.

*Primary Examiner* — D Glenn Dayoan
*Assistant Examiner* — E Turner Hicks
(74) *Attorney, Agent, or Firm* — Dinsmore & Shohl LLP

(57) ABSTRACT

A vehicle including a rocker extending in a vehicle longitudinal direction having a first surface and a second surface, at least one crossmember extending in a vehicle width direction from the first surface of the rocker, and at least one spacer coupled to the second surface of the rocker, the at least one spacer being in line with the at least one crossmember.

15 Claims, 3 Drawing Sheets

(56) References Cited

U.S. PATENT DOCUMENTS

2020/0140021 A1\* 5/2020 Grottke ................ B62D 27/06
2020/0377045 A1\* 12/2020 Renegar ............... B62D 25/025

\* cited by examiner

VEHICLE ROCKER WITH LOAD TRANSFERRING SPACER

TECHNICAL FIELD

The present specification generally relates to vehicle components for transferring a load and, more specifically, vehicle components for transferring a load to a rocker of a vehicle.

BACKGROUND

Vehicles include a rocker, also referred to as a rocker panel, on each side of the vehicle between front and rear wheel well openings. These rockers provide structural reinforcement in ensuring that the passenger cabin area does not deform during a collision because the rockers absorb a majority of the forces from a side crash event.

Due to some vehicles' structural geometry, mostly due to stylistic requirements, a vehicle may include structures that are more outboard than the rocker, such as, for example, a door hinge. During a side collision, the outboard structure receives an initial impact from an incoming object and deforms. This deformation may cause the B-pillar coupled to the rocker to receive some of the load and, thus, cause the rocker to rotate or twist. The rotated outer surface of the rocker allows the incoming object to slide and fails to handle the intended load. As a result, the outboard structure can further deform into the cabin of the vehicle and injure an occupant.

SUMMARY

In an embodiment, a vehicle is provided including a rocker extending in a vehicle longitudinal direction having a first surface and a second surface, at least one crossmember extending in a vehicle lateral direction and substantially orthogonal to the rocker, and at least one spacer coupled to the second surface of the rocker, the at least one spacer being in line with the at least one crossmember.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
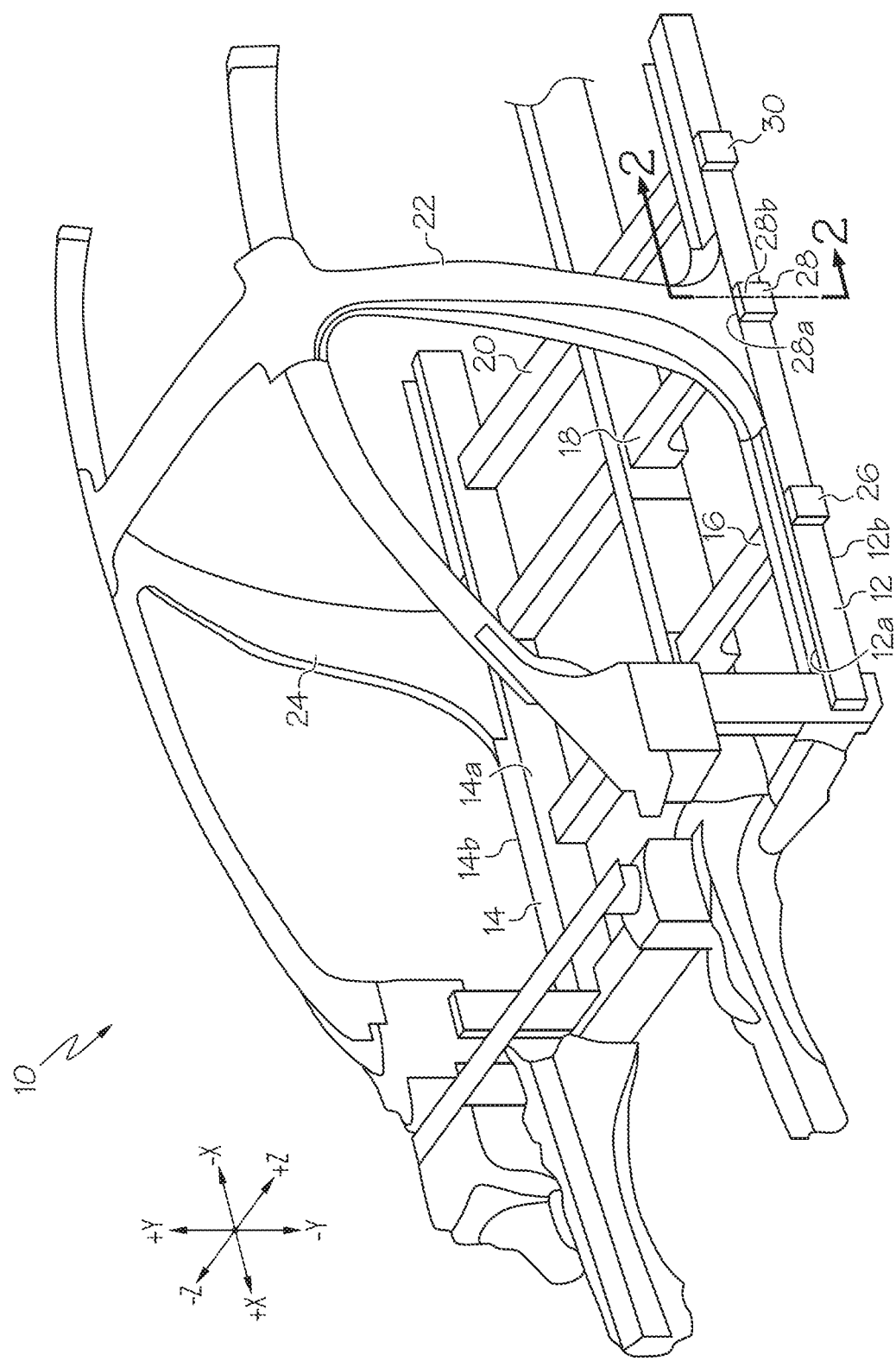
FIG. 1 depicts a perspective view of a vehicle frame, according to one or more embodiments shown and described herein.

Reference will now be made in detail to embodiments of a vehicle including a load transferring spacer described herein, examples of which are illustrated in the accompanying drawings. Whenever possible, the same reference numerals will be used throughout the drawings to refer to the same or like parts.

As used herein, the term "vehicle longitudinal direction" refers to the forward-rearward direction of the vehicle (i.e., in the +/− vehicle X direction depicted in FIG. 1). The term "vehicle lateral direction" refers to the cross-vehicle direction (i.e., in the +/− vehicle Z direction depicted in FIG. 1), and is transverse to the vehicle longitudinal direction. The term "vehicle vertical direction" refers to the upward-downward direction of the vehicle (i.e., in the +/− vehicle Y direction depicted in FIG. 1).

In some embodiments, a vehicle 10 is schematically depicted in FIG. 1 and generally includes a rocker 12 extending in a vehicle longitudinal direction, at least one crossmember 18 extending in a vehicle lateral direction from a first surface 12a of the rocker 12, and at least one spacer 28 coupled to a second surface 12b of the rocker 12, the at least one spacer 28 being in line with the at least one crossmember 18. The term "in line" as used herein is understood to mean two structures that are aligned with one another in at least the vehicle longitudinal direction. Various embodiments of the vehicle 10 having a rocker 12 and a load transferring spacer 28 and the operation of the vehicle 10 are described in more detail herein.

Figure 2:
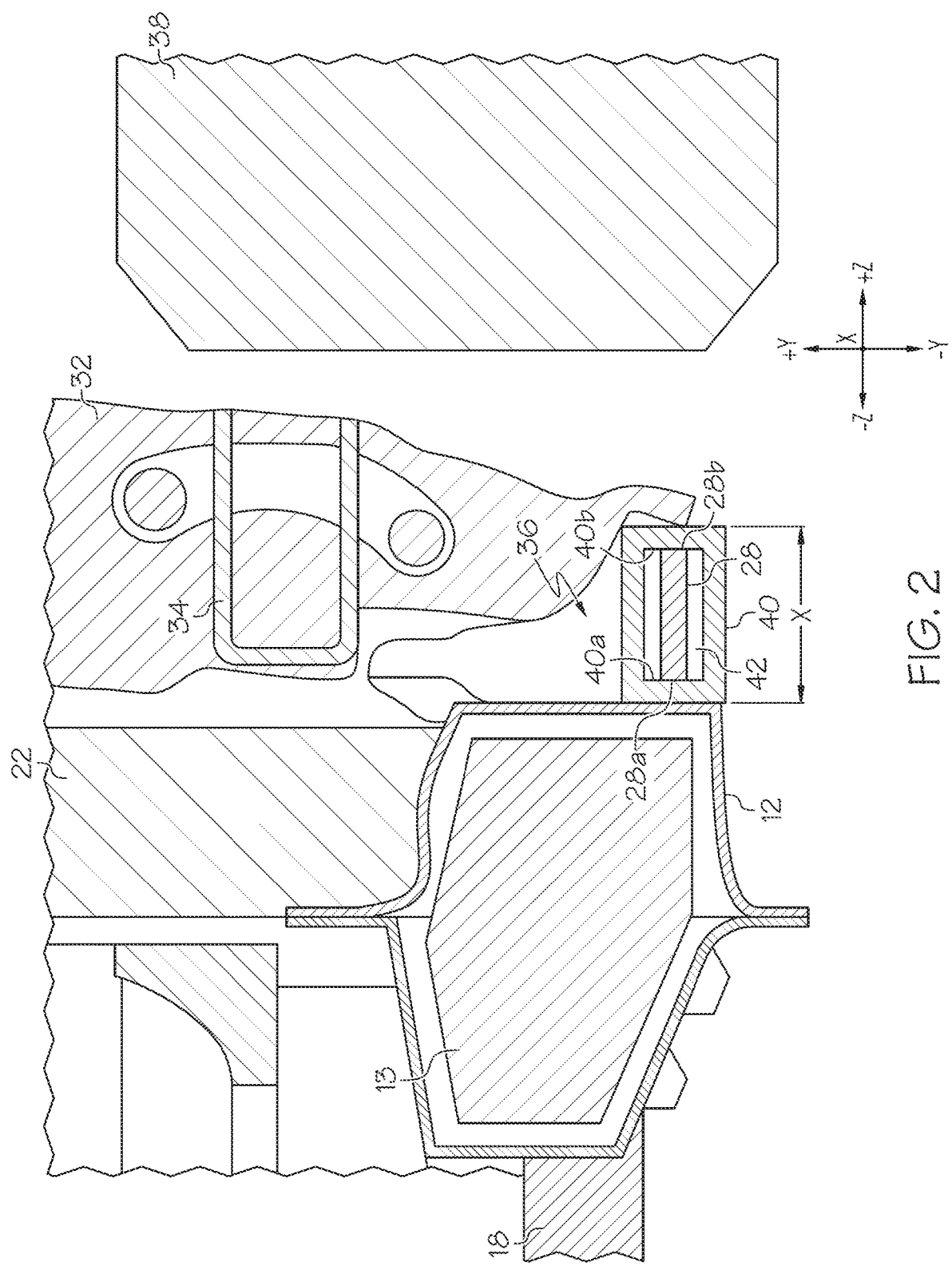
FIG. 2 depicts a cross-sectional view taken along line 2-2 of FIG. 1 and further including an outboard vehicle structure and a rocker molding, according to one or more embodiments shown and described herein.

Referring now to FIG. 1, a vehicle 10 is illustrated according to one or more embodiments described herein. Certain structure, such as an outboard vehicle structure 32 and a rocker molding 40, as shown in FIG. 2 and discussed below, are omitted from FIG. 1 in order to better illustrate a frame of the vehicle. It should be appreciated that the concept discussed herein is equally applicable to both unibody vehicles and body-on-frame vehicles. However, as shown, the vehicle 10 illustrated herein is a unibody vehicle including a first rocker 12 and a second rocker 14 extending in a vehicle longitudinal direction on opposite sides of the vehicle 10. The first and second rockers 12, 14 are substantially similar in structure. With respect to the first rocker 12, the rocker 12 has an inwardly facing first surface 12a and an outwardly facing second surface 12b. The second surface 12b is generally a planar surface configured to receive a load during a side collision of the vehicle 10.

The vehicle 10 also includes a plurality of crossmembers 16, 18, 20 extending in a vehicle lateral direction between the rockers 12, 14 and substantially orthogonal thereto. As shown, the vehicle 10 includes three crossmembers 16, 18, 20. However, it should be understood that the vehicle 10 may include any number of crossmembers 16, 18, 20 in order to support components of the vehicle 10. During a side impact, a load received by each rocker 12, 14 is transferred to the crossmembers 16, 18, 20.

In addition, the vehicle 10 includes a first B-pillar 22 and a second B-pillar 24, each extending upwardly from the rockers 12, 14. The B-pillars 22, 24 are generally welded to the rockers 12, 14 and facilitate transferring a load during a side collision from the rockers 12, 14 to the other areas of the vehicle 10 as the B-pillars 22, 24 are coupled to other support structures of the vehicle, such as, for example, a roof panel (not shown) of the vehicle 10.

The vehicle 10 described herein includes at least one spacer 26 coupled to the second surface of at least one rocker. In some embodiments, as shown in FIG. 1, a plurality of spacers 26, 28, 30 are provided on the second surface 12a of the first rocker 12. Although not shown in FIG. 1, it is to be understood that spacers may also be provided on a second surface 14b opposite a first surface 14a of the second rocker 14 as well.

Each spacer 26, 28, 30 is substantially similar and, thus, only one spacer 28 on the first rocker 12 will be discussed in detail herein. The spacer 28 includes a first surface 28a facing inwardly of the vehicle 10 and a second surface 28b facing outwardly of the vehicle 10. In some embodiments, as shown in FIG. 1, the first surface 28a of the spacer 28 is directly attached to the second surface 12b of the rocker 12. The spacer 28 may be attached to the rocker 12 by any suitable means such as by welding or using mechanical fasteners, such as clips, screws, or the like. The spacer 28 is formed from any material suitable to receive a high compression load. In some embodiments, the spacer 28 may be formed of metal, plastic, glass-filled resin, or the like. The spacer 28 may have any suitable geometry. For example, the spacer 28 may have a circular or rectangular geometry in order to conform to a geometry of the rocker 12 or to conform to a space between the rocker 12 and the outboard vehicle structure 32, as shown in FIG. 2 and discussed below.

In some embodiments, the spacers 26, 28, 30 are spaced apart from one another along the second surface 12b of the rocker 12. Spacing apart the spacers 26, 28, 30 allows for absorbing a force spread along a greater distance as opposed to providing the spacers 26, 28, 30 in an isolated area on the rocker 12. In some embodiments, the spacers 26, 28, 30 are positioned along the second surface 12b of the rocker 12 in line, in the vehicle longitudinal direction, with a location at which the crossmembers 16, 18, 20 intersect the rocker 12. Specifically, a first spacer 26 is in line with a first crossmember 16, a second spacer 28 is in line with a second crossmember 18, and a third spacer 30 is in line with a third crossmember 20. As described in more detail herein, the spacers 26, 28, 30 being positioned in line with the crossmembers 16, 18, 20 allows for a force caused by an impact load on the spacers 26, 28, 30, and thus the rocker 12, to be transferred more directly to the crossmembers 16, 18, 20. In some embodiments, the spacers 26, 28, 30 are also in aligned with the crossmembers 16, 18, 20 in the vehicle lateral direction.

Referring now to FIG. 2, the vehicle 10 includes an outboard vehicle structure, such as a door 32. The outboard vehicle structure may be any other structure or surface that extends further outboard in the vehicle lateral direction than the rockers 12, 14 and would receive a load during a side impact. As shown in FIG. 2, the door 32 is pivotally attached to the B-pillar 22 extending upwardly from the rocker 12 and includes a door hinge 34. A gap 36 is provided between the rocker 12 and a lower end of the door 32 defined by a distance X. Thus, without the spacer 28 provided within the gap 36, impact from an incoming object 38 would initially contact the door 32, causing the door hinge 34 to deform the B-pillar 22 prior to the load being transferred to the rocker 12. This would rotate the rocker 12 and prevent the rocker 12 from taking the intended load.

Therefore, to prevent the B-pillar 22 from taking an initial impact and rotating the rocker 12, the spacer 28 is provided within the gap 36 to reduce the distance X between the rocker 12 and the door 32. As such, the spacer 28 is coupled to the second surface 12b of the rocker 12 and extends toward the door 32 in the vehicle lateral direction. In some embodiments, the spacer 28 is dimensioned to extend the entire distance X such that the first surface 28a of the spacer 28 contacts the second surface 12b of the rocker 12 and the second surface second surface 28b of the spacer contacts the door 32. Thus, during a side impact, when the incoming object 38 contacts the door 32, deformation of the B-pillar 24 by the door 32 is reduced due to the fact that the door 32 contacts the spacer 28, thereby more efficiently transferring the load to the rocker 12.

It should be appreciated that by providing the spacer within the gap 36 between the rocker 12 and the door 32, the rocker 12 maintains its original orientation during a side impact without being rotated by deformation of the B-pillar 24. Thus, the rocker 12 is able to receive the intended load without causing the incoming object 38 to slide over the second surface 12b of the rocker 12. As the rocker 12 receives the impact, the load is then transferred to the adjacent crossmember 18 and the B-pillar 24 in order to disperse the load throughout the vehicle 10.

In some embodiments, the rocker 12 may be positioned lower than the door 32 and the gap 36 may not be provided between the rocker 12 and the door 32. However, the spacer 28 may still be provided to extend at least the distance X from the second surface 12b of the rocker 12 in order to contact the incoming object 38 during a side impact.

In an embodiment, the vehicle 10 includes a rocker molding 40, as shown in FIG. 2, having an inner wall 40a fixed to the second surface 12b of the rocker 12 and an opposite outer wall 40b. The rocker molding 40 extends along the rocker 12 in the vehicle longitudinal direction. The rocker molding 40 is generally a hollow member having a cavity 42 defined between the inner wall 40a and the outer wall 40b that extends between the rocker 12 and the door 32. The spacer 28 is fixed to the inner wall 40a of the rocker molding 40 and extends to the outer wall 40b of the rocker molding 40. As such, during a side impact, the door 32 contacts the outer wall 40b of the rocker molding 40 and compression thereof is prevented as the spacer 28 transfers the load from the outer wall 40b of the rocker molding 40 to the rocker 12. It should be appreciated that, as noted above, the rocker molding 40 is not necessary and the spacer 28 may be attached to the second surface 12b of the rocker 12 directly.

In some embodiments, the rocker 12 is generally an elongated, hollow member and includes a bulkhead 13 positioned within an interior of the rocker 12. The bulkhead 13 is a reinforcing member having a width extending in the vehicle lateral direction between opposite sides of the rocker in order to reinforce the sides of the rocker. Thus, during a side collision, the bulkhead 13 extends between the spacer 28 toward the crossmember 18 and completes a load path as the force of the impact is transferred through the rocker 12. As a result, the load path travels from the spacer 28 and through the bulkhead 13 within the rocker 12 in order to reinforce the sides of the rocker 12 and prevent significant deformation prior to the load being transferred to the crossmember 18 and the B-pillar 22. In some embodiments, the bulkhead 13 is a solid, elongated member extending in the vehicle longitudinal direction through the interior of the rocker 12. In other embodiments, the bulkhead 13 is a plate having a length substantially less than the length of the rocker 12. Thus, it should be appreciated that the bulkhead 13 may be specifically positioned between the spacer 28 and the crossmember 18. In addition, the rocker 12 may include a plurality of bulkheads 13 positioned within the rocker 12 and spaced apart from one another. Although shown, it should be appreciated that, in some embodiments, the bulkhead 13 is not provided. Thus, as noted above, the spacer 12 deforms the rocker 12 when the bulkhead 13 is not provided within the rocker 12.

Figure 3:
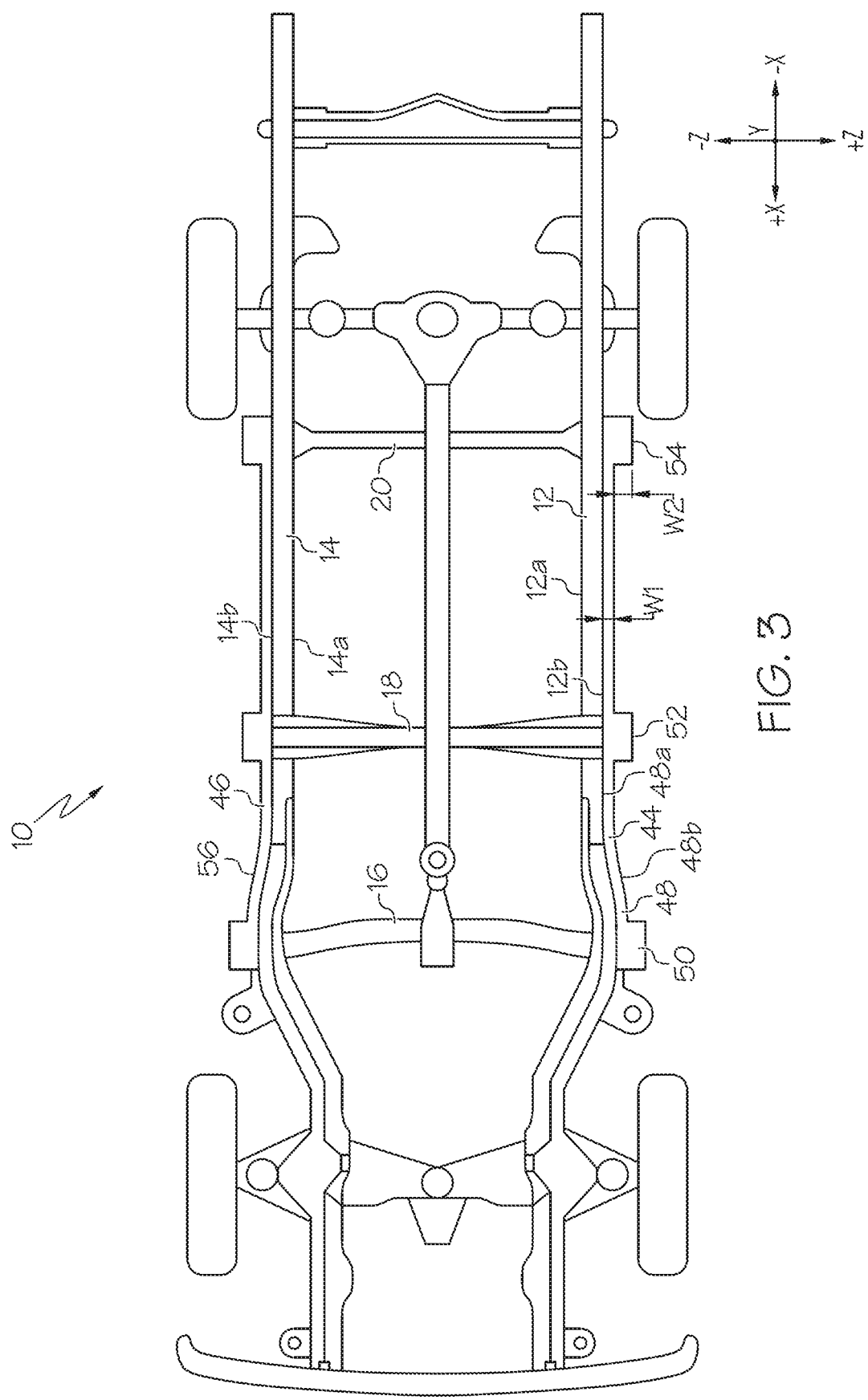
FIG. 3 depicts a partial top view of the vehicle of FIG. 1 illustrating an another embodiment of a spacer, according to one or more embodiments shown and described herein.

As shown in FIG. 3, a partial top view of the vehicle 10 is shown illustrating the pair of rockers 12, 14 and the crossmembers 16, 18, 20 interconnecting the rockers 12, 14. In an embodiment, a spacer 44, 46 is provided on each rocker 12, 14, respectively. The spacers 44, 46 are substantially similar and, thus, only spacer 44 will be discussed in detail herein. With respect to the spacer 44, the spacer 44 includes an elongated member 48 extending in the vehicle longitudinal direction along the first rocker 12. The elongated member 48 has an inwardly facing first surface 48a attached to the second surface 12b of the rocker 12, and an outwardly facing second surface 48b. The elongated member 48 has a member width W1 extending from the rocker 12 in the vehicle lateral direction. It may be appreciated that the member width W1 of the elongated member 48 may be sufficient to transfer a load from the incoming object 38. As such, the plurality of individual spacers 26, 28, 30, as shown in FIG. 1, is not necessary.

In some instances, the member width W1 of the elongated member 48 may not be great enough to absorb a load from an incoming object when the vehicle 10 includes an outboard vehicle structure extending further in the vehicle lateral direction. Therefore, in some embodiments, the elongated member 48, as shown in FIG. 3, may include at least one protrusion 50 extending from the second surface 48b of the elongated member 48 in the vehicle lateral direction. As shown, three protrusions 50, 52, 54 are formed extending from the second surface 48b of the elongated member 48. The protrusions 50, 52, 54 may have any suitable geometry for receiving a side impact, such as a circular or rectangular cross-section. Each protrusion 50, 52, 54 has a protrusion width W2 extending from the elongated member 48 in order to cover a distance between the rocker 12 and an outboard vehicle structure. Thus, during a side impact, the incoming object 38 will contact the protrusions 50, 52, 54 prior to deforming a B-pillar of the vehicle 10.

In some embodiments, as shown, the protrusions 50, 52, 54 are equidistantly spaced apart from one another along a length of the elongated member 48. Similar to the embodiment discussed in FIG. 1, the protrusions 50, 52, 54 may be formed to be in line with a respective crossmember 16, 18, 20. As such, the first protrusion 50 is in line with the first crossmember 16, the second protrusion 52 is in line with the second crossmember 18, and the third protrusion 54 is in line with the third crossmember 20. In this embodiment, it is to be understood that the second rocker 14 may also include a second elongated member 56 substantially similar structure to the elongated member 48 and, therefore, not discussed in detail herein.

From the above, it is to be appreciated that defined herein is a new and unique vehicle including a load transferring spacer extending outboard of a rocker on the vehicle.

It is noted that the terms "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a rocker extending in a vehicle longitudinal direction having a first surface and a second surface;
a plurality of crossmembers extending in a vehicle lateral direction and substantially orthogonal to the rocker; and
a plurality of spacers coupled to the second surface of the rocker and spaced apart from one another along the second surface of the rocker, each spacer of the plurality of spacers being in line, in the vehicle lateral direction, with a crossmember of the plurality of crossmembers.

2. The vehicle of claim 1, wherein the at least one spacer is made of metal, glass-filled resin, or plastic.

3. The vehicle of claim 1, wherein the at least one spacer comprises an elongated member extending longitudinally along the second surface of the rocker.

4. The vehicle of claim 3, wherein the at least one spacer comprises a plurality of protrusions extending substantially orthogonal to the elongated member.

5. The vehicle of claim 1, further comprising a B-pillar extending substantially orthogonal from the rocker, wherein, during a side impact, a load is transferred from the at least one spacer to the rocker prior to being transferred to the B-pillar.

6. The vehicle of claim 1, further comprising an outboard vehicle structure, a gap defined between the outboard vehicle structure and the rocker, the at least one spacer extending from the rocker within the gap, wherein the at least one spacer contacts the outboard vehicle structure.

7. The vehicle of claim 1, further comprising a rocker molding attached to the rocker, the rocker molding including a cavity formed therein, the at least one spacer provided within the cavity of the rocker molding.

8. A vehicle comprising:
a rocker extending in a vehicle longitudinal direction having a first surface and a second surface;
at least one crossmember extending in a vehicle lateral direction and substantially orthogonal to the rocker;
at least one spacer coupled to the second surface of the rocker, the at least one spacer being in line with the at least one crossmember; and
an outboard vehicle structure, a gap defined between the outboard vehicle structure and the rocker, the at least one spacer extending from the rocker within the gap, wherein the at least one spacer contacts the outboard vehicle structure and the outboard vehicle structure comprises a door.

9. The vehicle of claim 8, wherein the at least one spacer is made of metal, glass-filled resin, or plastic.

10. The vehicle of claim 8, wherein the at least one spacer comprises an elongated member extending longitudinally along the second surface of the rocker.

11. The vehicle of claim 10, wherein the at least one spacer comprises a plurality of protrusions extending substantially orthogonal to the elongated member.

12. The vehicle of claim 8, further comprising a plurality of spacers coupled to the second surface of the rocker, the plurality of spacers being spaced apart from one another along the second surface of the rocker.

13. The vehicle of claim 12, further comprising a plurality of crossmembers extending in a vehicle lateral direction and substantially orthogonal to the rocker, each spacer of the plurality of spacers being in line with a crossmember of the plurality of crossmembers.

14. The vehicle of claim 8, further comprising a B-pillar extending substantially orthogonal from the rocker, wherein, during a side impact, a load is transferred from the at least one spacer to the rocker prior to being transferred to the B-pillar.

15. The vehicle of claim 8, further comprising a rocker molding attached to the rocker, the rocker molding including a cavity formed therein, the at least one spacer provided within the cavity of the rocker molding.

* * * * *